US011329528B2

United States Patent
De Filippis

(10) Patent No.: US 11,329,528 B2
(45) Date of Patent: May 10, 2022

(54) ELECTRIC MACHINE WITH A SEALED ENCLOSURE HAVING A PRINTED CIRCUIT BOARD WITH TRACKS AND STOPPING ELEMENTS AND A RELEASING STRUCTURE FOR THE TRACKS

(71) Applicant: SPAL AUTOMOTIVE S.r.l., Correggio (IT)

(72) Inventor: Pietro De Filippis, Varazze (IT)

(73) Assignee: SPAL AUTOMOTIVE S.R.L., Corregio (IT)

(*) Notice: Subject to any disclaimer, the term of this patent is extended or adjusted under 35 U.S.C. 154(b) by 108 days.

(21) Appl. No.: 16/872,583

(22) Filed: May 12, 2020

(65) Prior Publication Data
US 2020/0366154 A1 Nov. 19, 2020

(30) Foreign Application Priority Data
May 13, 2019 (IT) .................. 102019000006768

(51) Int. Cl.
*H02K 5/136* (2006.01)
*H02K 11/33* (2016.01)
*H02K 5/18* (2006.01)

(52) U.S. Cl.
CPC ............ *H02K 5/136* (2013.01); *H02K 5/18* (2013.01); *H02K 11/33* (2016.01); *H02K 2211/03* (2013.01)

(58) Field of Classification Search
CPC .......... H02K 5/136; H02K 5/18; H02K 5/132; H02K 5/12; H02K 5/128; H02K 11/33; H02K 11/05; H02K 11/30; H02K 2211/03

USPC ............................................ 310/88, 87, 89
See application file for complete search history.

(56) References Cited

U.S. PATENT DOCUMENTS

| 3,830,331 | A |   | 8/1974 | Piazza |                        |
|-----------|---|---|--------|--------|------------------------|
| 5,034,620 | A | * | 7/1991 | Cameron | H01H 35/14            |
|           |   |   |        |         | 200/61.45 M           |
| 5,120,617 | A | * | 6/1992 | Cameron | H01M 50/581           |
|           |   |   |        |         | 429/61                |
| 5,707,250 | A | * | 1/1998 | Smithson | H01R 11/11           |
|           |   |   |        |         | 439/348               |

(Continued)

FOREIGN PATENT DOCUMENTS

| EP | 2214294 A1 | 8/2010 |
|----|------------|--------|
| EP | 2613973 A1 | 7/2013 |

(Continued)

OTHER PUBLICATIONS

Italian Search Report dated Oct. 17, 2019 for counterpart Italian Patent Application No. IT102019000006768.

*Primary Examiner* — Maged M Almawri
(74) *Attorney, Agent, or Firm* — Shuttleworth & Ingersoll, PLC; Timothy J. Klima

(57) ABSTRACT

An electric machine includes a conductive element disposed in such a way as to connect a first track and a second track of an electric power circuit to close the circuit; the conductive element being held in position by at least one mechanically breakable joint which, if subjected to a predetermined force, mechanically yields or breaks and thereby opens the electric power circuit; the machine includes a system for releasing the conductive element from the first and/or the second track if the casing of the electric machine is moved near the cap which covers the machine.

29 Claims, 9 Drawing Sheets

(56) References Cited

U.S. PATENT DOCUMENTS

| | | | | |
|---|---|---|---|---|
| 5,725,399 | A * | 3/1998 | Albiez | B60K 28/14 |
| | | | | 439/923 |
| 8,314,525 | B2 * | 11/2012 | Kragh | H02K 11/21 |
| | | | | 310/83 |
| 8,587,168 | B2 * | 11/2013 | Yamada | F04C 23/008 |
| | | | | 310/43 |
| 8,736,121 | B2 * | 5/2014 | Choi | H02K 1/02 |
| | | | | 310/71 |
| 9,012,777 | B2 * | 4/2015 | Adachi | H01R 3/00 |
| | | | | 174/88 R |
| 9,148,044 | B2 * | 9/2015 | De Filippis | H05K 1/0263 |
| 9,230,713 | B2 * | 1/2016 | Adachi | B60K 28/14 |
| 9,330,813 | B2 * | 5/2016 | Adachi | H01R 13/53 |
| 10,734,868 | B2 * | 8/2020 | Ushio | H01R 13/52 |
| 2008/0291650 | A1 * | 11/2008 | Hautvast | H02K 5/225 |
| | | | | 361/772 |
| 2010/0181850 | A1 * | 7/2010 | Ichise | H02K 11/33 |
| | | | | 310/71 |
| 2014/0139059 | A1 * | 5/2014 | De Filippis | H02K 9/223 |
| | | | | 310/64 |

FOREIGN PATENT DOCUMENTS

| | | |
|---|---|---|
| JP | 2013219862 A | 10/2013 |
| WO | 2013008180 A2 | 1/2013 |

* cited by examiner

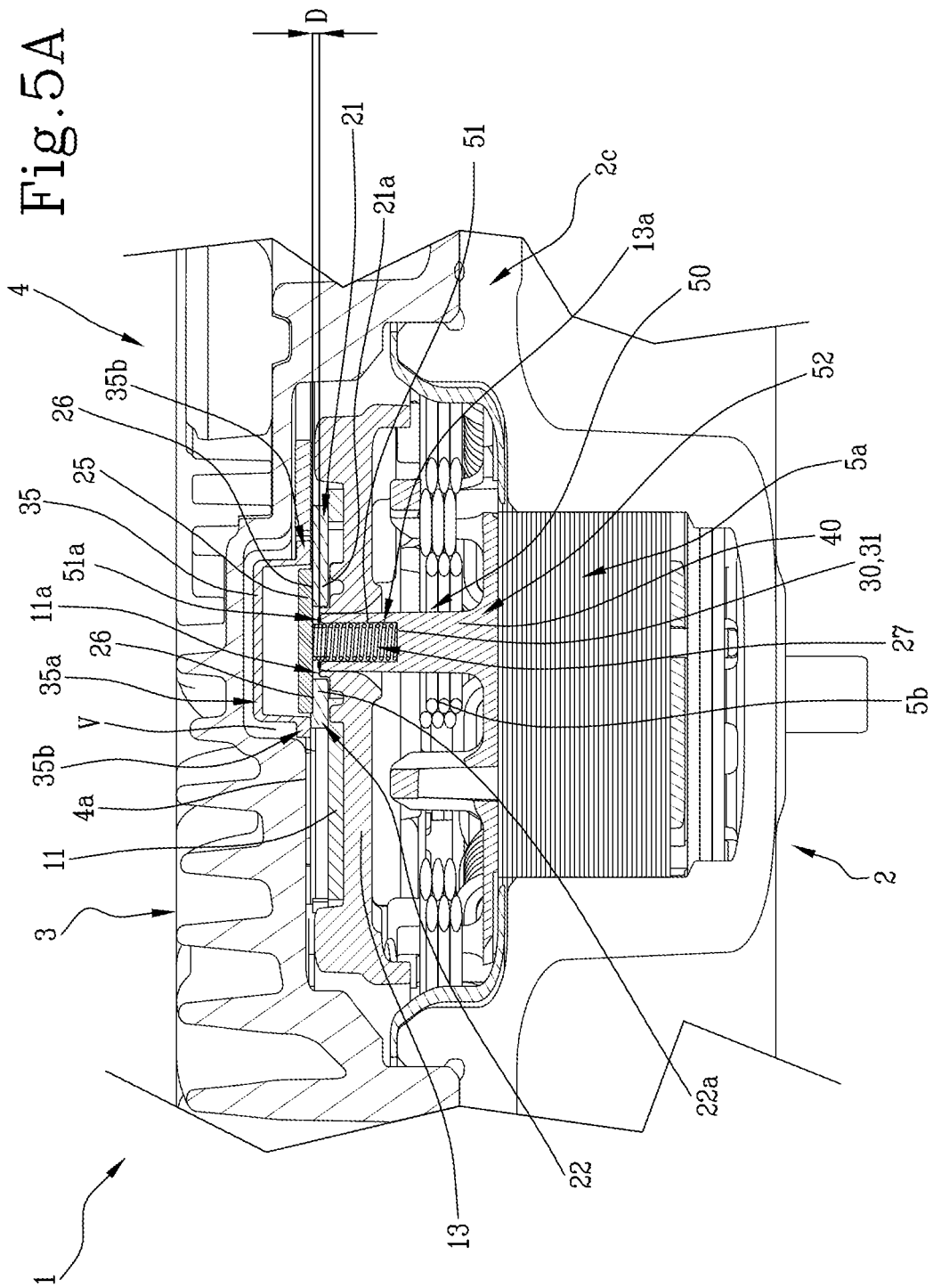

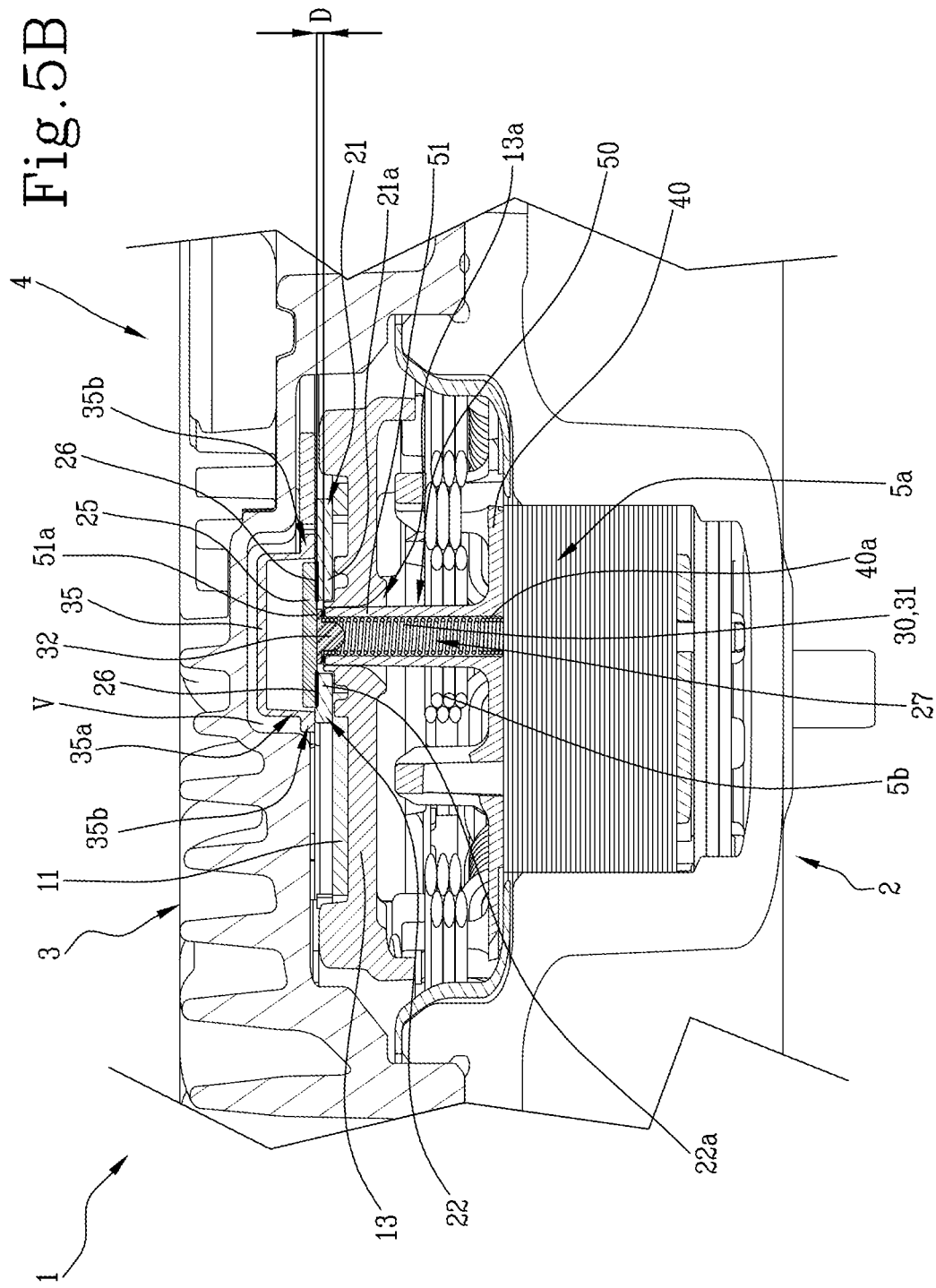

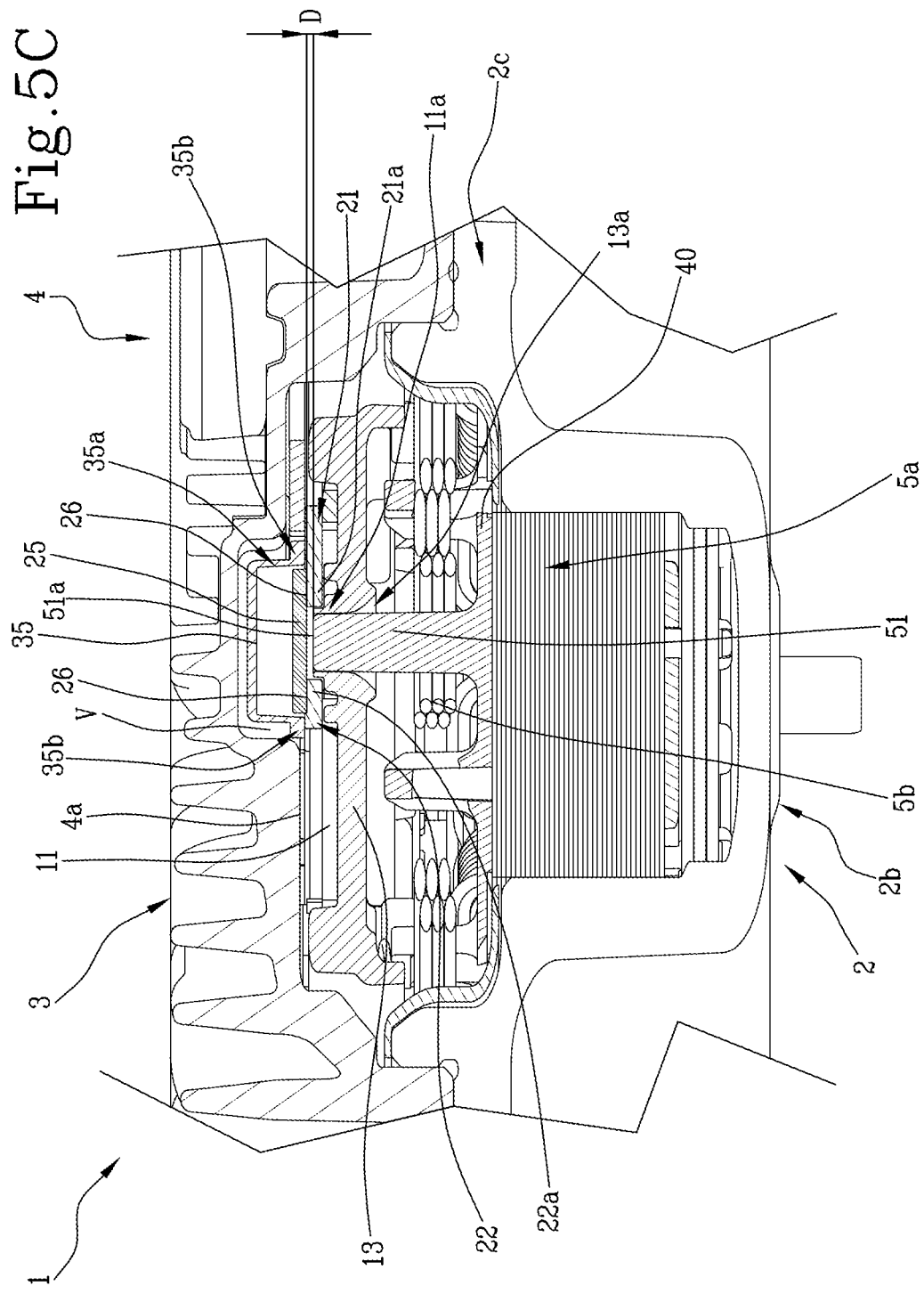

ELECTRIC MACHINE WITH A SEALED ENCLOSURE HAVING A PRINTED CIRCUIT BOARD WITH TRACKS AND STOPPING ELEMENTS AND A RELEASING STRUCTURE FOR THE TRACKS

This application claims priority to Italian Patent Application 102019000006768 filed May 13, 2019, the entirety of which is incorporated by reference herein.

This invention relates to an electric machine and, in particular, to an electric machine provided with a system for protection against short circuits in the event of an accident.

In general, an electric machine, for example a brushless electric motor to which reference is made hereinafter without limiting the scope of the invention, comprises a casing having inside a stator, rigidly connected to the casing, and a rotor, for example with permanent magnets, rotatably connected to the casing.

An example of a prior art electric machine is described in application WO2013008180 in the name of the present Applicant.

An electronic module or electronic drive circuitry, connected to the stator in brushless electric motors, comprises a printed circuit board and, disposed on the printed circuit board itself, a plurality of active and passive electronic components defining a power section and a plurality of electronic signal components defining a control section; generally speaking, there is a power circuit or line for supplying the electronic components of the power section in the electric machine.

The casing is covered by a cap to form a sealed container from which connecting pins protrude to allow powering and controlling the electronic drive circuitry.

Electric machines of this kind are used in particular in the automotive sector and in other sectors subject to stringent safety regulations which are constantly changing. More specifically, in this sector, there is a growing need to prevent or limit the risk of electrical short circuits when the vehicle in which the electric machine can be installed is involved in an accident.

A short circuit, in particular in the power line, might cause a fire which could spread from the electric machine to the entire vehicle.

In this context, the technical purpose which forms the basis of this disclosure is to propose an electric machine capable of meeting the above-mentioned need.

The aim of this invention is to provide an electric machine which reduces the risk of fire, in particular the risk of fires caused by short circuits in the electronic drive circuitry of the electric machine.

Other features and advantages of this disclosure are more apparent in the non-limiting description of an electric machine as illustrated in the accompanying drawings, in which.

Figure 1:
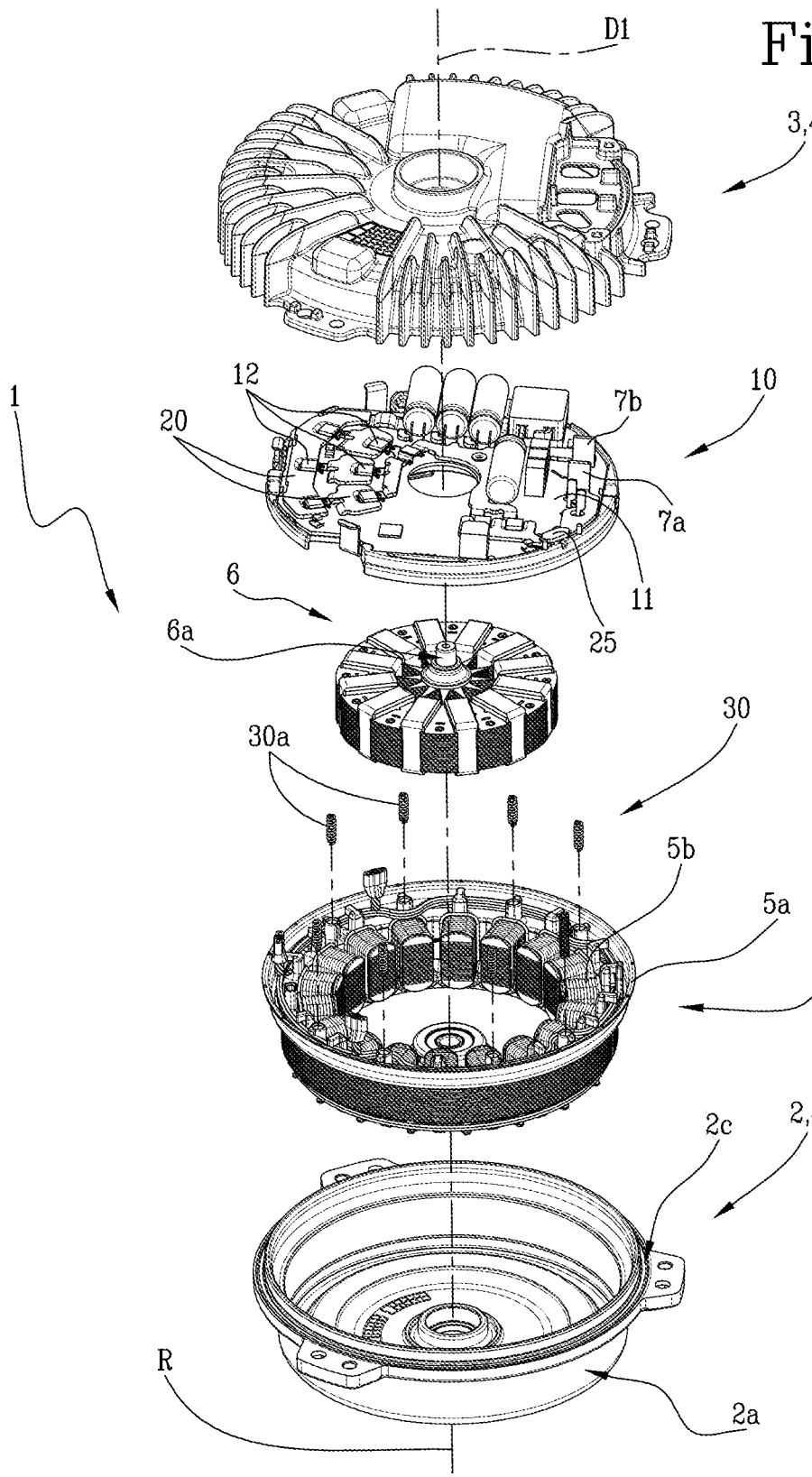
FIG. 1 shows an electric machine according to this disclosure in an exploded perspective view with some components removed for simplicity.

FIGS. 5A to 5E each show an embodiment of a detail of an electric machine according to this disclosure in a schematic cross section, with some parts cut away for greater clarity.

The numeral 1 generically denotes an electric machine according to this invention which is hereinafter described in detail only insofar as necessary for understanding this disclosure.

The electric machine 1 is preferably a rotary electric machine and is, for example, an electric motor of the sealed type, that is to say without any opening giving access to the inside of it. Hereinafter, express reference is made to this embodiment without thereby losing in generality, it being understood that the scope of the disclosure also includes electric motors of the open type, electric pumps or alternators.

In the embodiment illustrated, the electric machine 1 comprises a casing 2 and a cap 3 which covers the casing 2 to define, together with the casing 2, an enclosure 4, or container, which is closed and preferably sealed.

The casing 2 and the cap 3 are made of aluminium alloy but may be made of any other material.

The casing comprises a cup-shaped part 2a, delimited at the bottom by a base wall 2b and having an open end on the side opposite the base wall 2b.

At the open end, the casing 2 has a substantially annular flange 2c which extends radially from the cup-shaped part 2a and which is intended to be coupled to the cap 3.

More specifically, the flange 2c is connected to the cup-shaped part 2a by a moulding 2d which widens from the cup-shaped part 2a towards the flange 2c.

The cap 3 is coupled to the casing 2 at the flange 2c and the inside diameter of the cap 3, at least at the flange 2c, is larger than the outside diameter of the cup-shaped part of the casing.

That way, if the electric machine is compressed, for example by a force acting in a direction of action D1 parallel to the axis of rotation R of the machine, the cap 3 can slide on the cup-shaped part 2a in a substantially telescopic manner as a result, for example, of the flange 2c being deformed or breaking.

Preferably, in order to facilitate flattening of the machine 1 in the direction D1, the moulding 2d is provided with a weakening feature 60, preferably annular.

In the example illustrated, the feature 60 is in the form of an annular groove which weakens the moulding 2d. The feature 60 is preferably coaxial with the axis of rotation R of the machine 1 and its diameter is substantially equal to the outside diameter of the cup-shaped part 2a of the casing.

In alternative embodiments not illustrated, the feature 60 is, for example, a thin part of the moulding 2d or any other type of feature capable of defining a line of weakness of the casing 2.

Thus, if the electric machine 1 is compressed in the direction D1, the feature 60 makes it easier for the moulding 2d to collapse so that the cap can slide relative to the casing.

The cap 3 is provided with a wall 4a which faces or is directed towards the inside of the enclosure 4.

Preferably, in the example illustrated, the wall 4a is a dissipative wall, which is to say that it is configured to facilitate dissipation of the heat from the components inside the enclosure 4.

In the example, the cap 3 is preferably provided with a plurality of dissipating fins disposed at the dissipative wall 4a and directed towards the outside of the enclosure 4.

In the context of this solution, the wall 4a is not necessarily dissipative and might also be made, for example, of a thermally insulating plastic material.

Preferably, the electric machine 1 comprises a stator 5, fixedly mounted in the casing 2, and a rotor 6, comprising a shaft 6a, associated therewith and connected to the enclosure 4 rotatably about an axis of rotation "R".

In the preferred embodiment, the enclosure 4 (specifically the cap 3) defines an internal housing 61 directed towards the inside of the enclosure 4 so as to couple the rotor 6 to the enclosure 4.

Preferably, the internal housing 61 is delimited by a substantially annular protrusion 62, having the shape of a tube, for example, extending around the axis of rotation "R", towards the base wall 2b of the casing.

At the base of the protrusion 62, the cap 3 is provided with a weakening feature 63, preferably annular, which defines a preferential fracturing line of the cap 3 itself, as explained in more detail below.

In the example illustrated, the feature 63 is in the form of a groove and is preferably coaxial with the axis R.

In alternative embodiments, the feature 63 is, for example, a thin part of the cap 3 or it may be made in any other way suitable for defining a line of weakness of the cap 3 itself.

In the embodiment illustrated by way of example, the electric machine 1 comprises a bearing 64 mounted to the shaft 6a at a first end thereof.

The bearing 64 engages the internal housing 61 in such a way as to rotatably connect the shaft 6a to the enclosure 10, specifically to the cap 3.

The bearing 64 is inserted snugly into the internal housing 61 and the internal housing 61 is at least partly shaped to match an outside surface of the bearing 64 to prevent vibration of the shaft 6a.

If the machine 1 is compressed in the direction D1, the feature 63 facilitates fracturing of the cap along the feature itself, thereby allowing the shaft 6a and the bearing 64 to move relative to each other through the cap.

Figure 4:
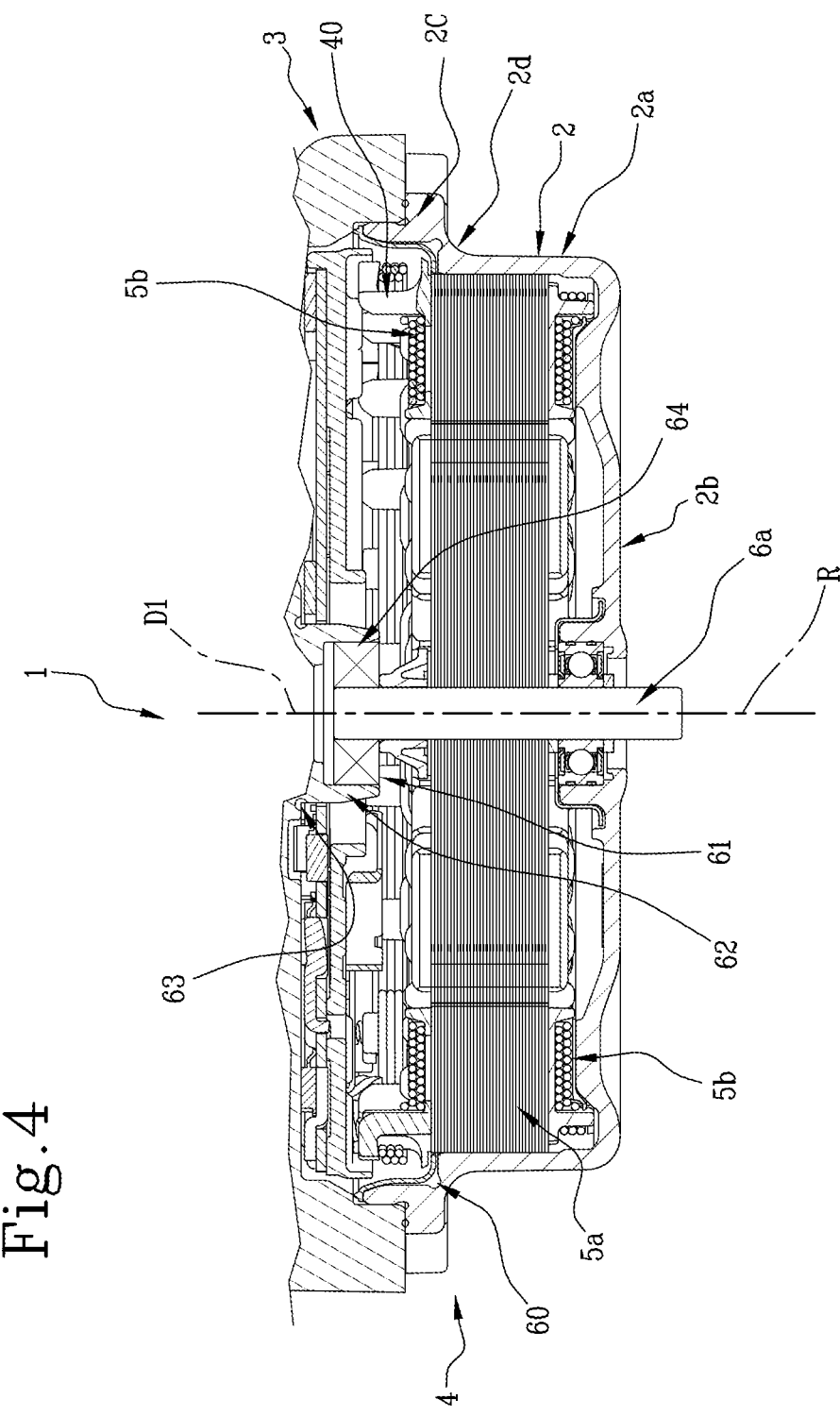
FIG. 4 shows a cross section of an electric machine according to this disclosure.

In practice, looking at FIG. 4, if the machine 1 is compressed in the direction D1, the casing can break along the feature 60 and the cap along the feature 63, thereby allowing the cap to slide telescopically over the casing.

Schematically, the stator 5 comprises: a ferromagnetic core 5a; a plurality of conductive windings 5b wound around it; and isolators interposed between the ferromagnetic core and the windings.

At least the ferromagnetic core 5a and the isolators define a stator mount for the conductive windings 5b.

Generally speaking, the term "stator mount", as used in this disclosure, means the set of components of the electric machine 1 which keep the windings 5b in shape and position, prevent accidental movement thereof and facilitate heat dissipation.

With reference to FIG. 4 in particular, it may be observed that in the example illustrated, the stator 5 is abutted against the base wall 2b of the casing 2, constituting a fixed reference for the stator. Generally speaking, the stator 5 is always abutted against a fixed reference in the casing 2: for example, in an embodiment not illustrated, an annular abutment element protruding from the side wall towards the inside of the casing itself.

That way, the stator 5, which is usually mounted to the inside of the casing 2, is immovable therein and mechanically blocked by a stop which prevents axial movements, in particular towards the base wall 2b, which may itself constitute a stop for the stator 5, as in the example illustrated.

The isolators in the stator 5, commonly known as "front pieces", are insulants and preferably made of polymeric material.

A first front piece 40 of the stator front pieces is provided with a plurality of holes 40a extending parallel to the axis of rotation "R".

The holes 40a allow the stator 5 to be mounted to the casing 2 using a machine which uses a plurality of bits to press directly on the ferromagnetic core through the holes 40a, thus preventing damage to the front piece 40.

The electric machine 1 comprises power pins 7a and 7b—for example, positive and negative, respectively—which, in the embodiment illustrated, pass through the enclosure 4 and are configured for electrical connection to a direct current power source outside the electric machine 1.

The electric machine 1 comprises an electronic module or electronic drive circuitry 10 which in turn comprises a printed circuit board 11, or PCB, and a plurality of electronic power components 12.

In the example embodiment, the electronic power components 12 comprise a plurality of power transistors—for example, MOSFETs 12a—electrically connected to the windings 5b to modulate their voltages and electric currents in order to drive and control the rotation of the rotor 6.

The electronic module 10 comprises a plurality of conductive tracks 20 between the power pins 7a and 7b and the electronic power components 12 in such a way as to form an electric circuit or power line 10a to feed the electronic power components 12. In the example embodiment illustrated, the tracks 20 are disposed on the printed circuit board 11, preferably in relief thereon. More specifically, the conductive tracks 20 are in relief by 1.8 mm on the printed circuit board 11.

In alternative embodiments, the tracks 20 are embedded or set in inside the PCB based, for example, on the power rating of the electric machine 1 and hence of the electronic power components 12.

Figure 5D:
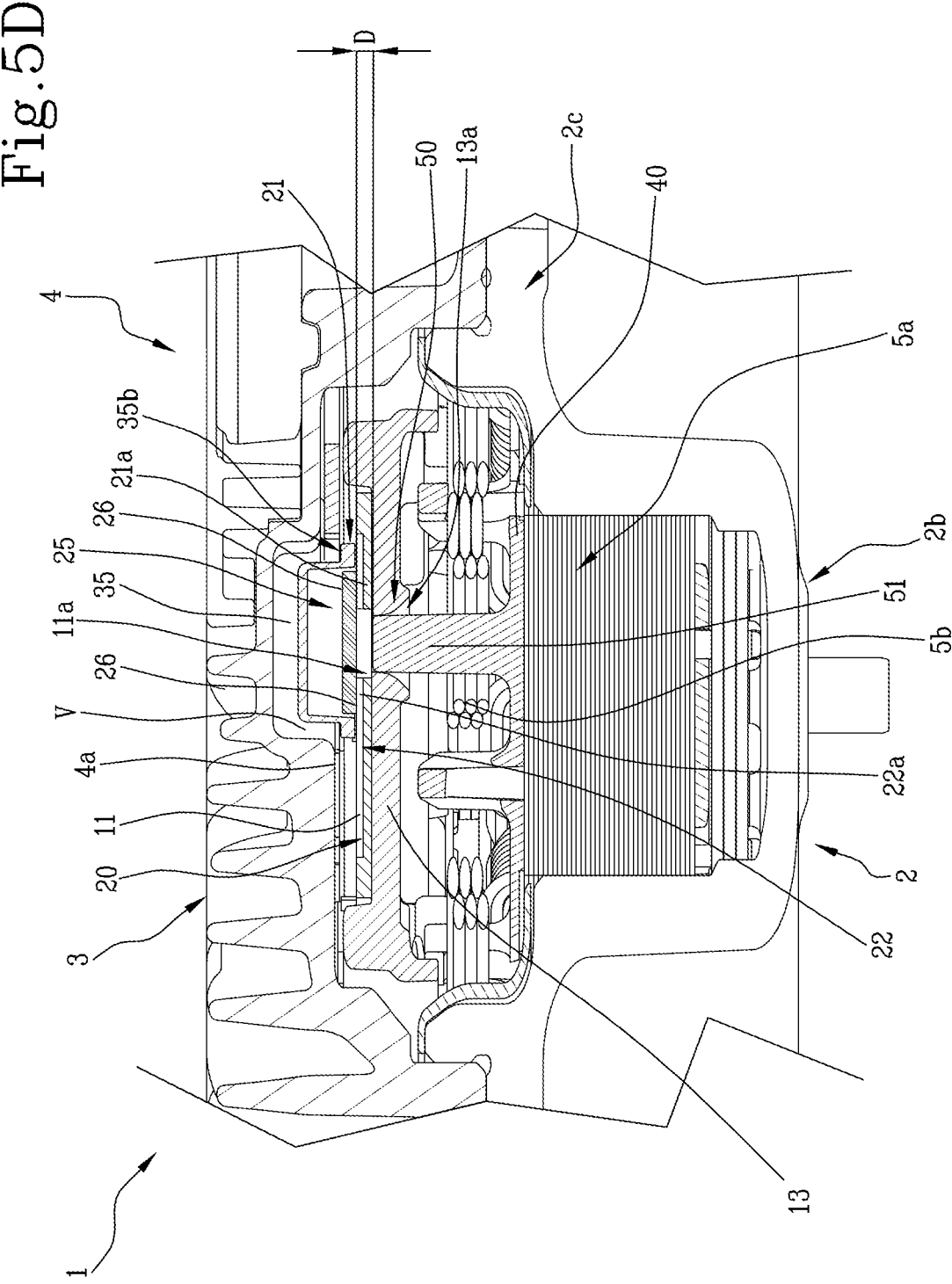

FIG. 5D, for example, illustrates an embodiment in which the power line 10 is made in the printed circuit board 11.

In the embodiment illustrated by way of example in FIGS. 5A-5D, the conductive tracks 20 are preferably disposed at a position facing the wall 4a and are preferably made of a copper alloy that is a good conductor of both electricity and heat.

Figure 2:
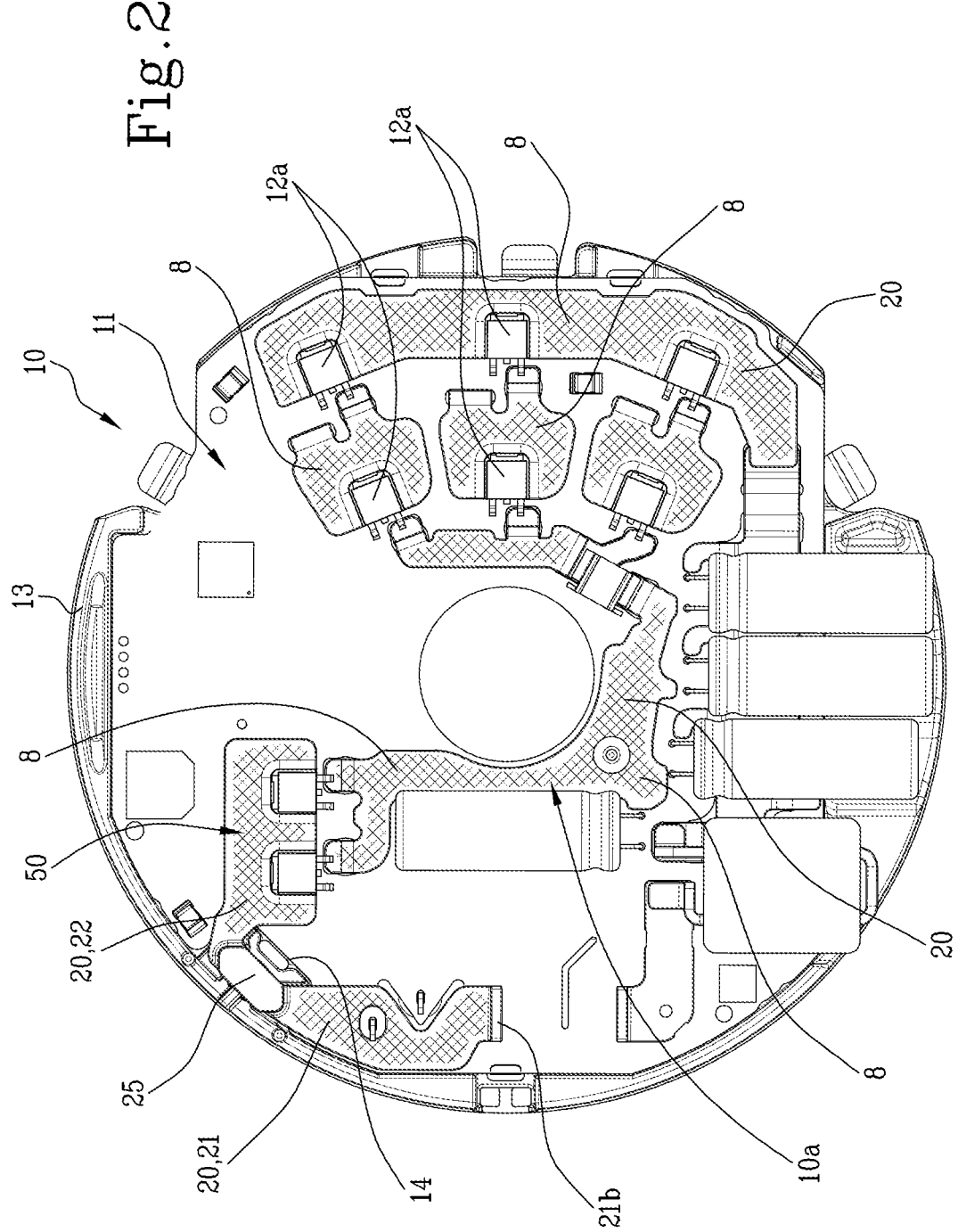
FIG. 2 shows an electronic module of an electric machine according to this disclosure in an exploded perspective view with some components removed for simplicity.
Figure 3:
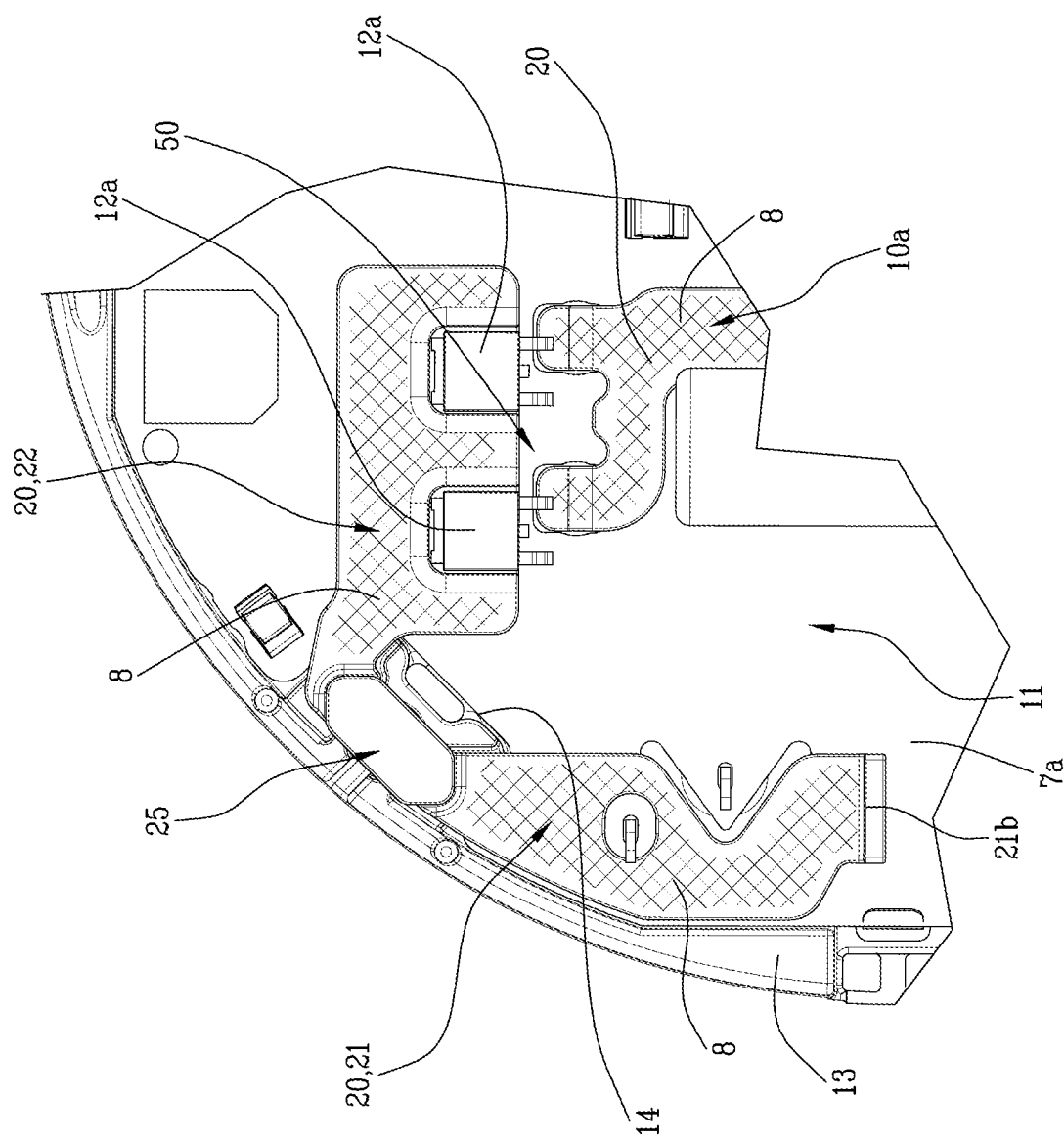
FIG. 3 shows a detail of the electronic module of FIG. 2 in a top view.

In the embodiment illustrated by way of example, a heat-conductive filler 8, comprising, for example, a heat-conductive paste, is interposed between the conductive tracks 20 and the wall 4a to fill in gaps between the two parts and facilitate heat conduction between them, as illustrated in FIGS. 2 and 3, where the heat-conductive filler 8b is represented by cross-hatching.

In practice, the conductive tracks 20 are placed in contact with the cap 3 by interposing the heat-conductive filler 8, which also acts as an electric insulant, since in the preferred embodiment, as already mentioned, the wall 4a is a dissipative wall which disperses at least part of the heat in the enclosure 4.

Whatever the case, the cap 3 defines, through the wall 4a, an abutment element for the conductive tracks 20, at least in the axial direction of action D1 parallel to the axis of rotation R.

In the example, the cap 3 defines an abutment element for the conductive tracks 20 by interposing the heat-conductive filler 8, which also acts as an electric insulant.

Generally speaking, in the embodiments illustrated, the wall 4a constitutes an abutment wall for the conductive tracks 20 and, in particular, for the first track 21 and/or the second track 22.

The heat-conductive filler 8 is preferably also interposed between at least some of the electronic power components 12 and the wall 4a to facilitate direct dissipation of the heat generated by them.

The conductive tracks 20 have respective surfaces for contact with the MOSFETs 12a and with the wall 4a (through the heat-conductive filler 8).

In the example illustrated, the contact surfaces of the conductive tracks are sized in such a way as to create, in conjunction with the size of the conductive tracks 20 themselves, a preferential path for dissipating the heat generated by the MOSFETs 12.

The plurality of conductive tracks 20 preferably comprises a first conductive track 21 and a second conductive track 22 forming an integral part of the electric power circuit 10a so that the power supply current of the electronic power components 12 passes through them.

In the embodiments illustrated by way of example, the first track 21 and the second track 22 are disposed on the top of the printed circuit board 11, preferably in relief thereon, in proximity to the power pins 7a and 7b. More specifically, the first track 21 comprises one of the power pins 7a and 7b, whilst the second track 22 is connected to the rest of the electronic module 10.

The track 21 can therefore be the track connected to the positive power pin or the track connected to the negative power pin.

The electronic module 10 comprises an electrically conductive element 25—for example, a metal plate or bridge—which is electrically connected to the first and the second track 21 and 22 to close the electric power circuit 10a.

Preferably, the electrically conductive element 25 is located at the positive power pin of the machine 1: that is to say, it is preferably physically close to the pin 7a.

Preferably, the electrically conductive element 25 is electrically close to the input of the power line 10a, meaning that in the electronic module 10 there are no electrical or electronic components between the pin 7a and the electrically conductive element 25.

The electrically conductive element 25 is mechanically connected to the first and second tracks 21, 22 in such a way that it can be separated therefrom in the event of an accident involving the electric machine 1, as explained in more detail below.

In the examples illustrated, the electrically conductive element 25 allows the currents between the power pins 7a and 7b to power the plurality of electronic power components 12 and to drive the rotor 6 in rotation.

The electrically conductive element 25 preferably has a thickness which is of the same order of size as the tracks so as not to create a resistive element of significant impact on the electric power circuit 10a.

The electrically conductive element 25 is fixed to the first and second tracks 21 and 22 by respective mechanically breakable joints 26.

In the embodiments illustrated in FIGS. 5a to 5D, the joints 26 are, for example, welds comprising a brazing alloy, preferably an alloy of tin and silver.

The joints 26 are mechanically breakable in the sense that the electrically conductive element 25, when subjected to a mechanical thrust force, tears or breaks the joints 26 and is disconnected from the tracks 20.

The force necessary to break the joints 26 is, for example, 4-500 N.

In the embodiments illustrated in FIGS. 5A and 5B, the joints 26 are preferably heat-sensitive.

In the preferred embodiments illustrated by way of example in FIGS. 5A to 5D, the electrically conductive element 25 is disposed to partly overlap the first and the second track 21 and 22 to form a bridge therebetween.

Figure 5E:
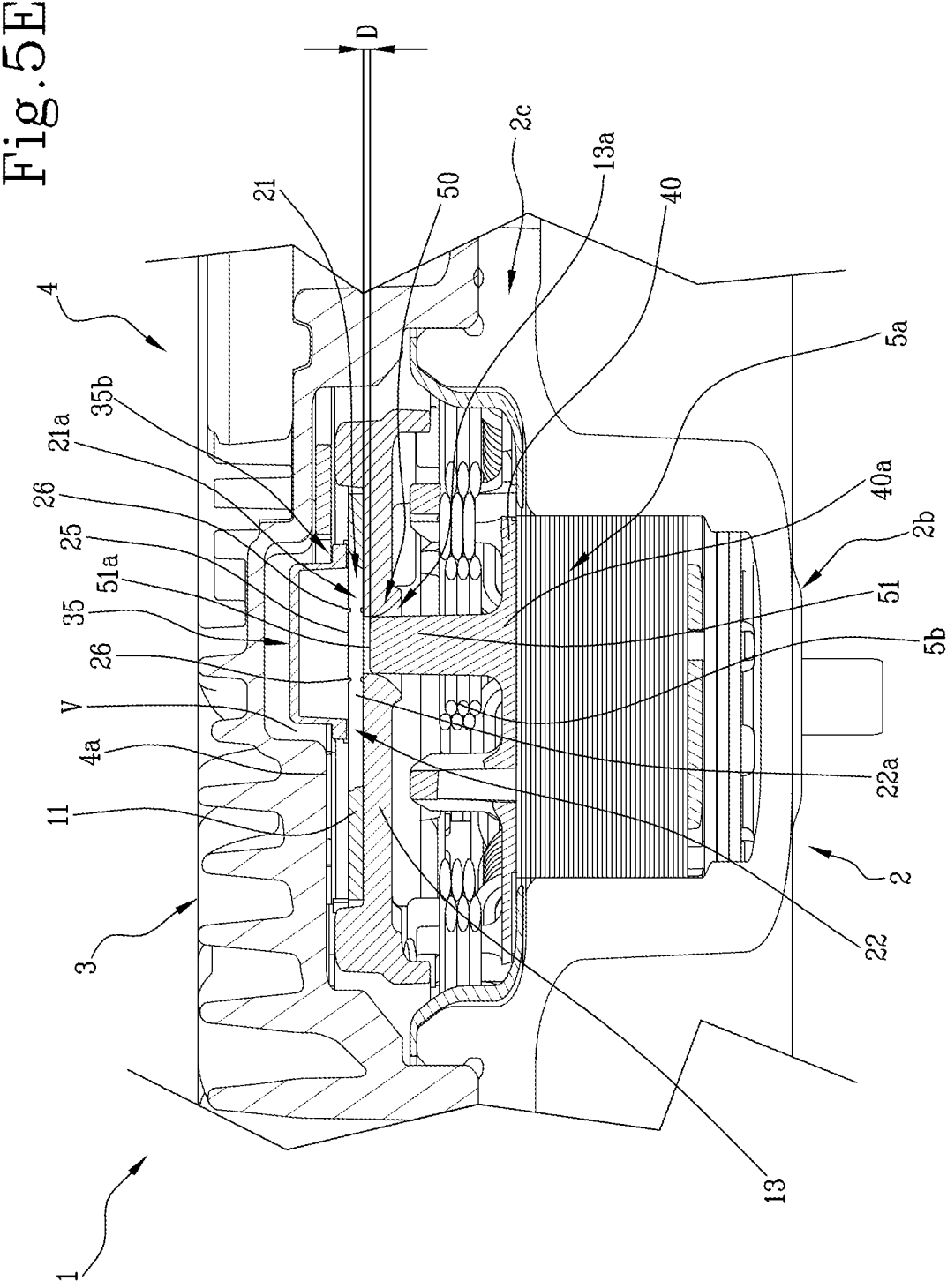

In an embodiment illustrated in FIG. 5E, the electrically conductive element 25 is substantially coplanar with the tracks 21, 22 and in any case defines a bridge between them. Preferably, the electrically conductive element 25 extends uninterruptedly as one with the tracks 21, 22. In such a case, the joints 26, in order for them to be mechanically breakable when a predetermined force is applied to them, are in the form, for example, of lines of weakness in which the material the conductive tracks 20 are made of is less thick at the ends of the electrically conductive element 25. In this embodiment, the electrically conductive element 25 is preferably also part of the printed circuit board 11 provided with sections of plastic material which, at the joint lines 26, are weaker than the rest of the printed circuit board 11 so that they too are mechanically breakable to a different extent compared to the rest of the printed circuit board.

Preferably, the electronic module 10, and in particular, the printed circuit board 11 is mounted on a supporting element 13 disposed on an underside of the printed circuit board 11.

The supporting element 13 is interposed between the electronic module and the stator and rotor 5 and 6. The supporting element 13 is preferably made of self-extinguishing, electrically insulating plastics and is provided with a housing for the electronic module 10.

The supporting element 13 has a lateral surface which is shaped to match the casing 2 or the cap 3 so as to reduce, in practice, the possibility of movement of the electronic module 10 inside the enclosure 4.

The electric machine 1 comprises a plurality of elastic means 30 acting on the electronic module 10 in such a way as to press it against the cap 3.

In the examples illustrated, the elastic means 30 comprise metal springs 30a, which might be replaced, for example, by elastomers and the like.

In the preferred embodiments, at least some of the springs 30a are inserted in the holes 40a in the front piece 40 and have one end abutted against the ferromagnetic core and the other end abutted against the supporting element 13 to press the entire module 10 away from the stator 5 and towards the wall 4a.

That way, amongst other things, the conductive tracks 20 are forced against the wall 4a.

More specifically, in the example illustrated, the conductive tracks 20 are forced against the wall 4a together with the heat-conductive filler 8 because, as mentioned above, the wall 4a is configured to dissipate heat.

In the embodiments illustrated in FIGS. 5A and 5B, the machine 1 comprises an elastic element 31, preferably a metal spring, to which reference is expressly made without thereby losing in generality, acting on the electrically conductive element 25 in such a way as to apply an elastic thrust force thereon directed away from the first and second conductive tracks 21 and 22.

This elastic thrust force is transmitted to the electronic module 10 through the joints 26, which are preferably heat-sensitive, so as to contribute to pushing it towards the dissipative wall 4a.

The machine 1 comprises a substantially cup-like seat or housing 27 for the elastic element 31.

The seat 27 is preferably formed in the front piece 40.

With reference to the embodiment shown in FIG. 5B, the housing 27 comprises one of the holes 40a on the front piece and passes through the hole to come directly into abutment against the ferromagnetic core 5a.

As illustrated, a first end of the elastic element 31 is preferably disposed in abutment against the ferromagnetic core 5a of the stator 5.

The second end of the spring 31, on the other hand, is operatively disposed in abutment against the electrically conductive element 25.

In practice, in the embodiment illustrated by way of example, the spring 31 has a line of action which is parallel to the axis of rotation of the machine 1.

A cover or spacer 32 made of electrically insulating material is disposed between the end of the spring 31 and the electrically conductive element 25 to prevent short circuits between the latter and the ferromagnetic core 5a.

The electric machine 1 comprises a system 50 for releasing or detaching the electrically conductive element 25 from the tracks 21, 22.

The system 50 comprises a stopper or stopping element 51 disposed on the side of the cap 3 opposite to the electrically conductive element 25.

As will become clearer below, if the machine 1 is flattened, the stopping element 51 acts as a thrust element which forces the electrically conductive element 25 to be detached from the tracks 20.

The stopper 51 is integral with the stator 5 and extends preferably parallel to the axis of rotation R of the machine 1.

The stopper 51 is preferably formed in the front piece 40 as a single part therewith.

One end 51a of the stopper 51 faces the electrically conductive element 25 and is spaced therefrom by a predetermined distance "D".

The predetermined distance "D" is, for example, between 1 mm and 3 mm.

As illustrated in FIGS. 5A and 5B, the stopping element 51 comprises the housing 27 of the elastic element 31.

In the embodiment of FIG. 5B, the stopper 51 is substantially tubular for its whole length and the spring 31 is disposed inside it and extends from the ferromagnetic core 5a to the electrically conductive element 25.

The elastic element 31 may itself form part of the stopping element 51. More specifically, the elastic element 31 may be sized to be close-packed and contribute to mechanically detaching the joints 26.

For example, in the compressed or close-packed configuration, the length of the elastic element 31, measured in the direction of action D1, is comparable with the length of the housing 27 measured in the direction D1.

In the embodiment of FIG. 5A, the stopper 51 has a solid base portion 52 and a hollow tubular portion defining the housing 27 which accommodates the elastic element 31.

The elastic element 31 itself forms part of the stopping element 51.

In the embodiments of FIGS. 5C and 5D, the stopping element 51 is shown as a single part, preferably solid, which extends from the front piece 40.

The printed circuit board 11 and the supporting element 13 are shaped to allow positioning the stopping element 51 between the ferromagnetic core 5a and the electrically conductive element 25.

As will become clearer below, in the embodiments illustrated by way of example, the printed circuit board 11 and the supporting element 13 are specially shaped and, for example, are each provided with a respective hole 11a, 13a for the passage of the stopping element.

The holes 11a, 13a for the passage of the stopping element 51 are larger in size than the stopping element 51 so that the stopping element 51 is able to slide in the event of flattening or deformation of the electric machine 1, for example in the direction of action D1, as will become clearer below.

More specifically, the hole 11a in the printed circuit board 11 and the hole 13a in the supporting element 13—if the printed circuit board is provided with a supporting element—extend for a greater length than the stopping element 51 in a plane transverse to the direction D1 of action of the stopping element 51.

Preferably, the printed circuit board 11 has a recess, i.e. an absence of material, at the stopping element 51, to define the hole 11a.

In an embodiment, the absence of material in the printed circuit board 11 is defined by a portion formed on its outer perimeter delimited by a concave end edge 14.

Preferably, the supporting element 13 has a through hole 13a under and substantially at the concave portion.

As illustrated in FIGS. 5A and 5B, the printed circuit board 11 and the supporting element 13 are shaped to also allow positioning of the stopping element 31 between the ferromagnetic core 5a and the electrically conductive element 25.

Preferably, the first and second tracks 21 and 22 have a first and a second end portion 21a and 22a, respectively, facing each other and protruding from the end edge 14 towards each other to form cantilevered conductive portions extending over the recess of the printed circuit board 11.

Preferably, the electrically conductive element 25 is welded to respective areas of the first and second end portion 21a and 22a where the first and second tracks are thinner than they are in the rest of their structure.

More specifically, in the examples illustrated, the electrically conductive element 25 is welded to the first and the second end portion 21a and 22a in such a way as to be suspended above the hole or absence of material in the printed circuit board 11, thanks also to the configuration of the containment housing.

Preferably, the printed circuit board 11 and the conductive element 25 are configured and mutually positioned in such a way that the vertical projection of the conductive element onto the positioning plane of the printed circuit board 11 is entirely inside the hole or absence of material.

With reference in particular to FIG. 5, the part of the enclosure 4 above the electrically conductive element 25 defines a housing space "V" adapted to enable the electrically conductive element 25 to move away from the first and second tracks 21 and If the machine 1 is flattened, for example in an axial direction, and the casing 2 penetrates the cap 3, the electronic module 10 and the stator 5 are subjected to relative motion towards each other.

Considering the casing 2 and the stator 5 to be stationary and the electronic module 10 to be movable, the stopping element 51 passes through the holes 11a, 13a in the supporting element and in the printed circuit board and stops the electrically conductive element 25, forcing its disconnection from the tracks 20 at the joints 26 and interrupting the circulation of current so as to make the electric machine 1 safe.

Considering the electronic module 10 to be stationary, the stopping element 51 passes through the holes 11a, 13a in the supporting element and in the printed circuit board and forces the electrically conductive element 25 to be disconnected from the tracks 20 at the joints 26, interrupting the circulation of current and making the electric machine 1 safe.

As already mentioned, if the machine 1 is flattened, the stopping element 51 defines a thrust element which pushes the electrically conductive element 25 away and disconnects it from the tracks 20.

The electrically conductive element 25 is movable away from the first and second tracks 21, 22 under the pushing action of the stopping element 51.

In practice, the release system 50 defines an isolating switch for the power line.

The spring 31 is not essential for operation as an isolating switch; instead of the spring, a rigid element only to remove the bridge may be provided.

When the joints 26 are broken—for example when the weld is broken—the spring, if present, helps keep the bridge away from the tracks.

In the event of an accident involving the vehicle, the electric machine breaks and the electronic circuit moves closer to the casing with which the stator is integral.

The cap pushes the electric circuit towards the casing and towards the stator, that is to say, towards the front piece.

Through the stopping element, the front piece pushes the electrically conductive element towards its way out, in the space V, when the joints 26 break.

The wall 4a of the cap 3, in contact with the tracks 20, holds the tracks in place while the stopping element 51 forces the electrically conductive element 25 to move away from them.

In the embodiments illustrated by way of example, the electric machine 1 comprises a stop lid 35, made of electrically insulating material and located near the conductive element 25, along a direction of thrust of the elastic element 31, preferably parallel to the axis of rotation R, in order to determine a stop position of the electrically conductive element 25 driven by the elastic element 31 when the joint 26 breaks.

The stop lid 35 is preferably at least partly coupled to the supporting element 13.

More specifically, the stop lid 35 is disposed in the housing space "V", preferably fixed to the printed circuit board 11 and/or to the supporting element 13 by a reversible clip connection.

In the embodiments of FIGS. 5A and 5B, the stop lid 35 preferably stops the electrically conductive element 25 at a limit position where the elastic element 31 is still loaded and presses the conductive element 25 against the stop lid 35 to prevent further movements which might create a short circuit between one of the conductive tracks 20 and the enclosure 4, connected to earth, or between other components of the electronic module 10 and the electric power circuit 10a.

This stop position determines a distance, for example, of at least 2 mm—preferably at least 3 mm—between the electrically conductive element 25 and each of both the first and the second track 21 and 22.

In the preferred embodiments illustrated, the stop lid 35 comprises a cup-like portion 35a, extending into the space V, and at least one flange 35b, which extends, at an opening of the cup-like portion, towards the conductive tracks 20 in such a way as to be interposed between the tracks and the cap 3.

If the electrically conductive element 25 is pushed into the space V by the stopping element 51, the external flange 35b electrically isolates the tracks 20 and the cap 3 from each other and thus averts the risk of electrical contact between the tracks 20 and the cap 3.

Preferably, the elastic element 31 is configured to apply a residual pressure on the electrically conductive element 25 at the stop position so as to lock it at that position in the presence of accelerations on the electrically conductive element up to 20 g—preferably up to 50 g—which can occur on the electric machine 1 in situations created by high impact or resonance in the vehicle engine compartment where it is essential that the electric power circuit 10a remains open.

In the preferred embodiment, the stop lid 35 has a concave shape, in particular at the cup-like portion of it 35a, and is disposed in such a way as to fully enclose the conductive element 25 at the stop position. Further, the stop lid 35 and the supporting element 13 are configured to define a protective cage around the electrically conductive element 25 to prevent access by particles or extraneous objects large enough to close the electric power circuit 10a when the electrically conductive element 25 is at the stop position.

More specifically, the stop lid 35 defines an upper portion of the cage and a portion of the supporting element 13 around the through hole 13a for the passage of the elastic element 31 is configured to close the upper portion at the bottom.

Preferably, both the stop lid 35 and the supporting element 13 are made of self-extinguishing, electrically insulating materials with a melting point at least 80° C. higher than the predetermined threshold temperature, so as to keep the electric power circuit 10a in the open condition in the presence of exceptionally high temperatures inside the enclosure 4 and other faults or exceptional events.

To minimize the possibility of a short circuit remaining in the electronic module 10 after the electric power circuit 10a has been opened by the electrically conductive element 25, the latter is disposed in proximity to the power pin 7a.

The power pin 7a is preferably one end 21b of the first track 21.

That way, when the motor is flattened, the stopper 51 opens the electric circuit at a point as close as possible to the power input so as to isolate or disconnect most of the electrical circuitry in the electric machine.

The electric machine 1 is protected against short circuiting in the event of an accident.

In the examples illustrated, the stop element, in the event of an accident involving the electric machine, allows breaking the power line by disconnecting the electrically conductive element which acts as bridge across the two portions of the line.

When the electrically conductive element is connected to the conductive tracks using a layer of heat-sensitive material subjected to the force of the elastic element, it is capable of cutting the electrical power supply to the electrical components of the electric machine, thus also constituting an effective system of protection against high temperature and high current.

In the electric machine described herein by way of example, the elastic element, if provided, which pushes the conductive element has the twofold purpose of providing the above described protection against high temperature and current and pressing the electronic module against the specifically dissipative wall to facilitate dissipation of heat; advantageously, this translates as higher production efficiency and lower production costs.

Advantageously, the thrust force applied by the elastic element 31 on the electrically conductive element 25 creates strain in the joints 26 and the latter are configured to resist it mechanically when their temperature is below a predetermined threshold temperature, specifically a temperature at which the brazing alloy melts, preferably between 180° C. and 250° C., and still more preferably, between 200° C. and 230° C.

If the temperature of the joints 26 is greater than the predetermined threshold temperature, the joints mechanically yield to the strain and break, for example because the brazing alloy melts, causing the electrically conductive element 25 to move away from the first and/or the second conductive track 21 and 22 so as to break the electrical connection between them.

This event opens the power supply circuit of the electric power circuit 10a and instantaneously cuts the power supply to the electronic power components 12, causing the electric machine 1 to stop. Advantageously, these features constitute a high temperature protection for the electric machine 1.

The invention claimed is:

1. An electric machine comprising:
   a casing and a cap to cover the casing, coupled to each other to define a sealed enclosure;
   a stator and a rotor, associated with the stator, both disposed inside the sealed enclosure, the stator comprising a stator mount integral with the casing,
   an electronic module disposed in the sealed enclosure between the casing and the cap and comprising a printed circuit board, a plurality of electronic power components and a plurality of conductive tracks defining an electric power circuit between respective power pins of the electric machine;
   an electrically conductive element disposed in such a way as to connect a first track and a second track of the plurality of conductive tracks in order to close the electric power circuit, the electrically conductive element being held in position by at least one mechanically breakable joint which, if subjected to a predetermined force, mechanically yields or break and thereby opens the electric power circuit,
   a system for releasing the electrically conductive element from the first track and/or from the second track, the system comprising a stopping element interposed between the stator and the electrically conductive element to apply the predetermined force if the casing moves closer to the cap, the stopping element being aligned at least partly with the electrically conductive element along a direction of action parallel to an axis of rotation of the electric machine, the sealed enclosure defining a housing space adapted to allow the electrically conductive element to move away from the first track and/or from the second track.

2. The electric machine according to claim 1, wherein the stopping element is disposed on a side of the cap opposite to the electrically conductive element.

3. The electric machine according to claim 1, wherein one end of the stopping element faces the electrically conductive element and is spaced therefrom by a predetermined distance between 1 mm and 3 mm.

4. The electric machine according to claim 1, wherein the electrically conductive element at least partly overlaps the first track and the second track on an opposite side of the stopping element.

5. The electric machine according to claim 1, wherein the stopping element has a main direction of extension which is parallel to the axis of rotation.

6. The electric machine according to claim 1, wherein the at least one mechanically breakable joint is made of an alloy of tin and silver, the electrically conductive element being welded to the first track and/or to the second track.

7. The electric machine according to claim 1, wherein the cap defines an internal housing facing towards the inside of the sealed enclosure to couple the rotor to the sealed enclosure, the internal housing being delimited by a protrusion extending around the axis of rotation towards a base wall of the casing, the cap including a second weakening feature, coaxial with the axis of rotation and defining a preferential fracturing line of the cap.

8. The electric machine according to claim 1, wherein the cap defines an abutment element for the first track and the second track at least in the direction of action, the electronic module being interposed between the cap and the stator, the electric machine further comprising an electrical insulant interposed between the first and second tracks and the cap.

9. The electric machine according to claim 1, and further comprising a stop lid made of electrically insulating material disposed along the direction of action of the stopping element, the stopping element being configured, after the at least one mechanically breakable joint has broken, to move the electrically conductive element towards the stop lid.

10. The electric machine according to claim 9, wherein the stop lid comprises a cup-shaped portion extending into the housing space and at least one flange which extends from the cup-shaped portion towards the first track and the second track in such a way as to be interposed between the first and second tracks and the cap.

11. The electric machine according to claim 1, wherein the electrically conductive element is disposed in proximity to a positive power pin and/or a negative power pin of the electric machine.

12. The electric machine according to claim 11, wherein the electronic module is free of electrical or electronic components between the positive power pin and the electrically conductive element and/or between the negative power pin and the electrically conductive element.

13. The electric machine according to claim 1, wherein the stopping element is integral with the stator.

14. The electric machine according to claim 13, wherein the stator mount comprises an isolator facing towards the electronic module and the stopping element extends from the isolator.

15. The electric machine according to claim 14, wherein the stopping element is made as a single part with the isolator.

16. The electric machine according to claim 1, wherein the printed circuit board includes a hole for passage of the stopping element, the printed circuit board being interposed between the electrically conductive element and the stator.

17. The electric machine according to claim 16, and further comprising a supporting element interposed between the electronic module and the stator to support the electronic module, the supporting element including a hole for passage of the stopping element.

18. The electric machine according to claim 17, wherein the hole in the printed circuit board and the hole in the supporting element extend for a greater length than the stopping element in a plane transverse to the direction of action so that in an event of flattening and deformation of the electric machine, the stopping element is able to slide through the hole in the printed circuit board and through the hole in the supporting element.

19. The electric machine according to claim 1, wherein the casing comprises a cup-shaped part in which the stator is inserted, which is delimited at the bottom by a base wall and which has an open end on a side opposite the base wall, a substantially annular flange extending radially from the cup-shaped part at the open end, the cap being coupled to the casing at the flange, an inside diameter of the cap being greater than an outside diameter of the cup-shaped part of the casing at least at the flange.

20. The electric machine according to claim 19, wherein the flange is connected to the cup-shaped part by a molding which widens from the cup-shaped part towards the flange, the molding including a weakening feature for weakening the molding.

21. The electric machine according to claim 20, wherein the weakening feature comprises an annular groove, which is coaxial with the axis of rotation and having a diameter substantially equal to the outside diameter of the cup-shaped part of the casing.

22. The electric machine according to claim 1, wherein the sealed enclosure includes an abutment wall at least for the first track and/or for the second track.

23. The machine according to claim 22, wherein the abutment wall is a wall of the cap, the first track and the second track facing directly towards the cap.

24. The electric machine according to claim 22, wherein the abutment wall is a dissipative wall and the electric machine comprises:
   a heat-conductive filler interposed between the electronic module and the sealed enclosure to facilitate heat conduction from the electronic module to the dissipative wall;
   an elastic device acting on the electronic module to press the electronic module against the dissipative wall of the sealed enclosure so as to compress the heat-conductive filler;
   the elastic device comprising an elastic element pressed against the electrically conductive element to apply an elastic thrust force on the at least one mechanically breakable joint.

25. The electric machine according to claim 24, wherein the at least one mechanically breakable joint is heat-sensitive and configured to break under an action of the elastic thrust force if subjected to a temperature higher than a predetermined threshold temperature in order to open the electric power circuit, the stopping element comprising the elastic element.

26. The electric machine according to claim 24, wherein the stopping element comprises a housing to accommodate the elastic element.

27. The electric machine according to claim 26, wherein the stopping element is substantially tubular for a whole length thereof and defines the housing, the elastic element being disposed inside the stopping element and extending from a ferromagnetic core of the stator to the electrically conductive element, the elastic element being electrically isolated to avoid short-circuiting between the ferromagnetic core and the electrically conductive element.

28. The electric machine according to claim 27, wherein the elastic element has a compressed or close-packed configuration, with a length, measured in the direction of action, comparable with a length of the housing measured in the direction of action, so as contribute to mechanically detaching the at least one mechanically breakable joint.

29. The electric machine according to claim 26, wherein the stopping element comprises a solid base portion and a hollow tubular portion defining the housing, the elastic element extending in the housing from the solid base portion to the electrically conductive element.

* * * * *